United States Patent [19]

Shimizu et al.

[11] Patent Number: 5,260,358
[45] Date of Patent: Nov. 9, 1993

[54] POLYURETHANE COATING COMPOSITION

[75] Inventors: Hiroshi Shimizu, Suita; Mitsuru Nakagawa, Otsu; Uhei Hirose, Kusatsu, all of Japan

[73] Assignee: Isamu Paint Co., Ltd., Osaka, Japan

[21] Appl. No.: 981,685

[22] Filed: Nov. 25, 1992

[30] Foreign Application Priority Data

Dec. 18, 1991 [JP] Japan ................................. 3-353843

[51] Int. Cl.$^5$ ............................................... C08G 18/74
[52] U.S. Cl. ........................................ 524/31; 524/733; 525/123; 525/440; 528/73
[58] Field of Search ................... 524/31, 733; 525/123, 525/440; 528/73

[56] References Cited

U.S. PATENT DOCUMENTS 4,552,902  11/1985  Nafziger et al. ...................... 528/73

Primary Examiner—Maurice J. Welsh
Attorney, Agent, or Firm—Millen, White, Zelano, & Branigan

[57] ABSTRACT

A two-package polyurethane coating system is provided which consists of a paint component comprising an OH-containing film-forming resin, such as a polyacrylate polyol or an alkyd resin, and a thinner-curing agent component which is a solution, adjusted to insure a predetermined final application viscosity of the coating, of trimerized isophorone diisocyanate which functions as a curing agent for the resin in an active hydrogen-free organic solvent which functions as a thinner, the two components being supplied in independent cans for mixing and application at a coating site without need for viscosity adjustment.

5 Claims, No Drawings

POLYURETHANE COATING COMPOSITION

FIELD OF THE INVENTION

The present invention relates to a two-package polyurethane coating composition which is easy to mix at sites of application.

BACKGROUND OF THE INVENTION

Two-component polyurethane coatings are in broad use in applications involving plastic or other substrates which are liable to deform on heating or where the coated artifact cannot be heat-treated en bloc in a curing oven as it is true with repair painting of a motor vehicle. The usual two-component polyurethane coating is put to use by mixing a paint component comprising a hydroxyl-containing film-forming resin and an auxiliary component comprising a curing agent, i.e. an organic polyisocyanate compound, each supplied in an independent can. At the coating job site, however, the coating must be adjusted to a viscosity suitable for the coating method to be used, e.g. spray coating. Therefore, after the paint component is mixed with the auxiliary component, the mixture must be diluted with an organic solvent (thinner) not containing active hydrogen. Although such a coating system is generally termed a two-component coating, actually the three components of rein, curing agent and thinner each supplied in an independent can must be blended in suitable proportions at the coating job site.

It would certainly expedite and simplify the preparatory work at the job site a great deal should the required number of cans be reduced from three to two. However, since it is technically impossible to premix the resin with the curing agent and supply the premix in a single can, the only available approach that might be contemplated is to mix the curing agent with the thinner beforehand and supply the mixture in a single can. However, polyisocyanates not only react easily with active hydrogen compounds such as water, alcohols and amines but dimerize, trimerize or polymerize by themselves. Although the neat form of a polyisocyanate is fairly stable, diluting it with a thinner increases the opportunity for such reactions and the resulting dilution tends to undergo clouding (turbidity), precipitation, flocculation, thickening and/or gelation, thus making it virtually unserviceable. Thus, it has been impossible to dissolve the required amount of a polyisocyanate in the total necessary quantity of a thinner beforehand. The inevitable choice was to provide the thinner supplied in an independent can.

DISCLOSURE OF THE INVENTION

The inventors of the present invention discovered after much exploratory research that, among the various polyisocyanates which are commercially available today, only trimerized isophorone diisocyanate (IPDI trimer) is specifically stable in thinners at concentrations not higher than 5% by weight, preferably not higher than 3% by weight, as NCO. Based on this new knowledge, the inventors succeeded in developing a two-package plyurethane coating system in which the total required amount of the curing agent is supplied as previously dissolved in the total required quantity of the thinner in one and the same can for expedient mixing with the resin component supplied in another can to promptly constitute a coating.

The present invention is, therefore, directed to a two-package polyurethane coating system comprising (a) a paint component comprising a hydroxyl-containing film-forming resin and a thinner-curing agent component obtainable by dissolving isophorone diisocyanate trimer at a final concentration, as NCO, of not more than 5% by weight in a sufficient quantity of an organic solvent not containing active hydrogen to dilute said resin component to an appropriate application viscosity at a job site, said components (a) and (b) being supplied in independent cans for ready mixing and application at the job site.

DETAILED DESCRIPTION OF THE INVENTION

As mentioned hereinabove, organic polyisocyanates in general undergo aging in thinner solution to undergo clouding, precipitation, flocking, thickening and gelation so that they cannot enjoy a sufficiently long shelf-life. The polyisocyanates in current use in the coating field include hexamethylene diisocyanate (HDI), isophorone diisocyanate (IPDI), hydrogenated xylene diisocyanate (HXDI), xylylene diisocyanate (XDI) and tolylene diisocyanate (TDI), and the corresponding polymers such as trimethylolpropane (TMP) adducts, biurets and trimers. Therefore, the inventors performed a comprehensive screening test on the stability of thinner dilutions of these polyisocyanates, which were prepared in the following manner. First, to a solvent mixture of xylene, ethyl acetate and methyl isobutyl ketone (70:20:10, by weight) was added 2 parts by weight of synthetic zeolite and the mixture was allowed to stand for 24 hours to a water content of not more than 300 ppm. Each test polyisocyanate was then added to the solvent mixture at a predetermined final NCO concentration. The screening was performed as follows.

1. Open stability

A 18-liter oil can was filled with 10 l of the thinner dilution of each polyisocyanate and, without closure, allowed to stand for one month. The stored dilution was then examined for appearance and NCO content. The results are presented in Tables 1, 2 and 3.

2. Open-close cycle test

A 18-liter oil can was filled with 10 l of the test thinner dilution and was allowed to stand for 60 minutes without closure and, then, for 3 hours under closure. Thereafter, the can was kept open for 60 minutes. A 100 ml portion of the dilution was withdrawn and the can was kept hermetically closed for 19 hours. The above procedure being regarded as one cycle, 50 cycles were repeated and the remaining dilution was examined for appearance and NCO content. The results are shown in Tables 2 and 3.

3. 60° C. accelerated stability test

A 150 ml test tube was filled with 100 ml of the test thinner dilution and the tube was stoppered tight and allowed to stand in an incubator at 60° C. for one month. Thereafter, the test dilution was examined for appearance and NCO content.

The results are presented in Tables 2 and 3.

TABLE 1

| Compound | Open stability test NCO (%) | | | | | | | | |
|---|---|---|---|---|---|---|---|---|---|
| | 8% | 7% | 6% | 5% | 4% | 3% | 2% | 1% | 0.1% |
| HDI biuret | x | x | x | x | x | x | x | x | x |

TABLE 1-continued

| | Open stability test | | | | | | | | |
|---|---|---|---|---|---|---|---|---|---|
| | NCO (%) | | | | | | | | |
| Compound | 8% | 7% | 6% | 5% | 4% | 3% | 2% | 1% | 0.1% |
| HDI biuret A | o | c | c | x | x | x | x | x | x |
| HDI biuret B | o | o | x | x | x | x | x | x | x |
| HDI adduct A | o | o | x | x | x | x | x | x | x |
| HDI adduct B | o | x | x | x | x | x | x | x | x |
| HDI trimer A | c | o | c | x | x | x | x | x | x |
| HDI trimer B | o | o | x | x | x | x | x | x | x |
| IPDI adduct A | x | x | x | x | x | x | x | x | x |
| IPDI trimer | c | c | c | c | c | c | c | c | o |
| HXDI adduct | x | x | x | x | x | x | x | x | x |
| XDI adduct | x | x | x | x | x | x | x | x | x |
| TDI adduct | c | c | x | x | x | x | x | x | x | c No abnormality for 1 month
x Turbidity, precipitation or gelation

The results revealed that IPDI timer is stable in the thinner. Therefore, its stability at various concentration levels was further investigated by the same procedure as above. The results are presented in Table 3.

film-forming resin and a thinner dilution of IPDI trimer. The hydroxyl-containing film-forming resin, which is used in the paint component, includes, but is not limited to, acrylate, epoxy, polyester, alkyd and vinyl resins, castor oil and so on. Particularly preferred are polyacrylic polyols [such as polyacrylate polyols obtainable by polymerization of hydroxyl-containing monomers such as 2-hydroxyethyl methacrylate and polyacrylate polyols modified by cellulose derivatives such as nitrocellulose, cellulose acetate butyrate (CAB), etc.] and alkyd resins.

The paint component including said hydroxyl-containing film-forming resin may, of course, be used as dissolved in a solvent and may contain the routine additives such as the leveling agent, antifoam, ultraviolet absorber, etc., as well as pigments such as a colored pigment and an extender, where necessary.

As one of the advantages of the present invention, the IPDI trimer can be added to the thinner for a cold (room temperature) -cure alkyd paint at a concentration of not more than 5% by weight before supply and the alkyd resin can then be diluted to a desired application viscosity with the thinner at the coating job site. Then, the film characteristics of the alkyd coating can be improved and the composition becomes applicable not only as a top coat but as a primer or a surfacer.

The thinner which can used for diluting the IPDI trimer is an organic solvent which is inert to the polyisocyanate, that is to say a solvent not containing active hydrogen. The organic solvent that can be generally

TABLE 2

| | | | Stability | | | | | |
|---|---|---|---|---|---|---|---|---|
| | | Nonvolatile | Open test | | Open-close cycle test | | 60° C. Accelerated test | |
| Compound | NCO (%) | matter (%) | Appearance | NOC (%) | Appearance | NCO (%) | Appearance | NCO (%) |
| HDI biuret A | 3 | 13.6 | Turbidity | 1.2 | Turbidity | 0.9 | Turbidity | 0.9 |
| HDI biuret B | 3 | 12.8 | Turbidity | 1.0 | Turbidity | 0.8 | Turbidity | 0.8 |
| HDI adduct A | 3 | 17.3 | Precipitation | 0.8 | Precipitation | 0.6 | Precipitation | 0.6 |
| HDI adduct B | 3 | 17.0 | Precipitation | 0.8 | Precipitation | 0.6 | Precipitation | 0.6 |
| HDI trimer A | 3 | 13.9 | Turbidity | 1.2 | Turbidity | 1.0 | Turbidity | 1.0 |
| HDI trimer B | 3 | 14.1 | Turbidity | 1.2 | Turbidity | 1.0 | Turbidity | 1.0 |
| IPDI adduct | 3 | 20.8 | Gelation | — | Flocculation | 0.8 | Flocculation | 0.9 |
| IPDI trimer | 3 | 18.3 | No abnormality | 3.2 | No abnormality | 2.9 | No abnormality | 2.9 |
| HXDI adduct | 3 | 20.4 | Precipitation | 0.8 | Precipitation | 0.7 | Precipitation | 0.7 |
| XDI adduct | 3 | 19.9 | Precipitation | 0.8 | Precipitation | 0.7 | Precipitation | 0.6 |
| TDI adduct | 3 | 17.3 | Flocculation | 0.3 | Flocculation | 0.2 | Flocculation | 0.1 | employed includes aliphatic hydrocarbons such as mineral spirit, solvent naphtha, volatile oil for rubber, etc.; aromatic hydrocarbons such as toluene, xylene, etc.; esters such as ethyl acetate, butyl acetate, isobutyl ace-

TABLE 3

| | | | Stability | | | | | |
|---|---|---|---|---|---|---|---|---|
| | | Nonvolatile | Open test | | Open-close cycle test | | 60° C. Accelerated test | |
| Compound | NCO (%) | matter (%) | Appearance | NOC (%) | Appearance | NCO (%) | Appearance | NCO (%) |
| IPDI trimmer | 3 | 18.3 | No abnormality | 3.2 | No abnormality | 2.9 | No abnormality | 2.9 |
| IPDI trimer | 2 | 12.2 | No abnormality | 2.2 | No abnormality | 1.9 | No abnormality | 1.9 |
| IPDI trimer | 1 | 6.1 | No abnormality | 1.2 | No abnormality | 0.9 | No abnormality | 0.9 |
| IPDI trimer | 0.5 | 3.0 | No abnormality | 0.6 | No abnormality | 0.5 | No abnormality | 0.5 |
| IPDI trimer | 0.1 | 0.6 | No abnormality | 0.1 | No abnormality | 0.1 | No abnormality | 0.1 |

The results indicated that when used as a thinner for adjusting the application viscosity of a polyurethane paint, a thinner dilution of IPDI trimer may function as a curing agent as well. This finding was a surprise in view of the fact that all other polyisocyanates were generally believed to be unstable at concentrations below 5% as NCO.

The coating system of the present invention consists of a paint component comprising a hydroxyl-containing tate, butyric esters, propionic esters, etc.; ketones such as acetone, methyl ethyl ketone (MEK), methyl isobutyl ketone (MIBK), diisobutyl ketone, diethyl ketone, etc.; glycol ethers such as ethylene glycol monobutyl ether, methoxypropyl acetate, etc.; ether esters (ethylene glycol monoethyl ether acetate, propylene glycol monomethyl ether acetate, etc.] and so on.

For purposes of the present invention, mixed solvents are preferred to neat solvents. Thus, for example, mixtures of one or more aromatic hydrocarbons (10-80% by weight), esters (5-50% by weight), ketones (0-30% by weight), aliphatic hydrocarbons (0-50% by weight) and ester ethers or glycol ethers (0-50%) can be advantageously employed.

The polyisocyanate which can be employed in the present invention is IPDI trimer or a polyisocyanate composition containing the same. IPDI trimer is the product of trimerization of monomeric IPDI forming an isocyanurate ring structure. In the present invention, IPDI trimer is diluted with a thinner to a concentration of not more than 5% by weight, preferably not more than 3% by weight, as NCO, and the resulting thinner-curing agent component is supplied in a can independent of the resin component which is supplied in a different can. It is preferable that diluting the resin to a desired application viscosity with the above thinner-curing component gives an NCO/OH ratio in the range of 0.2 to 2.5 and an NCO content in the range of 0.1 to 5% by weight, particularly 0.1 to 3% by weight. Thus, mere mixing of the two components, viz. the OH-containing film-forming resin component supplied in one can and the thinner-curing agent component supplied in another can, yields a coating composition which can be applied as such.

The coating composition thus obtained can be applied to substrates by the conventional coating methods, typically by spray coating or electrostatic coating, and can be allowed to cure at atmospheric temperature. The performance of the resulting cured film is fully comparable to that of the conventional two-component polyurethane system. The following examples and comparative examples are further illustrative of the invention. In the examples, all parts and % are by weight.

PRODUCTION EXAMPLE 1

| | |
|---|---|
| Polyacrylate polyol* | 630 Parts |
| Titanium dioxide | 250 Parts |
| Butyl acetate | 30 Parts |
| Xylene | 90 Parts |
| Total | 1000 Parts |

Note *1 Acrydic A801P manufactured by Dainippon Ink and chemicals, Inc.

A mayonnaise bottle is filled with 100 parts of polyacrylate polyol, 250 parts of titanium dioxide and 90 parts of xylene. After addition of the same amount of glass heads 2.5 mm in diameter, the bottle is agitated with a paint shaker until the pigment has been dispersed to a grain size of not more than 10 μ. After removal of the glass beads by filtration, 530 parts of polyacrylate polyol and 30 parts of butyl acetate are added and the mixture is stirred with a Disper to give a resin component A.

PRODUCTION EXAMPLE 2

Except that polyacrylate polyol (Acrydic® 52-666, manufactured by Dainippon Ink and Chemicals)*2 is used in lieu of polyacrylate polyol*1, the procedure of Production Example 1 is repeated to give a paint component B.

PRODUCTION EXAMPLE 3

| | |
|---|---|
| Polyacrylate polyol*3 | 500 Parts |
| Nitrocellulose*4 | 40 Parts |
| Dibutyl phthalate | 50 Parts |
| Titanium dioxide | 150 Parts |
| Ethyl acetate | 100 Parts |
| Toluene | 50 Parts |
| Xylene | 110 Parts |
| Total | 1000 Parts |

Note *3 Acrydic ® A-817, manufactured by Dainippon Ink and Chemicals.
Note *4 Nitrocellulose RS½ sec., manufactured by Daicel Chemical Industries, Ltd.

Of the above formula, 50 parts of polyacrylate polyol, 150 parts of titanium dioxide and 10 parts of xylene are taken and dispersed until the grain size of the pigment has been reduced to not more than 10 μ as in Production Example 1 and after removal of glass beads, the balance of the formula is added and stirred with the Disper to give a paint component C.

PRODUCTION EXAMPLE 4

| | |
|---|---|
| Polyacrylate polyol*3 | 630 Parts |
| Cellulose acetate butyrate*5 | 25 Parts |
| Titanium dioxide | 260 Parts |
| Butyl acetate | 30 Parts |
| Xylene | 55 Parts |
| Total | 1000 Parts |

Note*5 CAB ® 551-02, manufactured by Eastman Chemical

Of the above formula, 100 parts of polyacrylate polyol, 260 parts of titanium dioxide and 55 parts of xylene are dispersed to a grain size of not more than 10 μ as in Production Example 1 and, after removal of glass beads, the balance of the formula is added and stirred with the Disper to give a paint component D.

PRODUCTION EXAMPLE 5

| | |
|---|---|
| Alkyd resin*6 | 650 Parts |
| Titanium dioxide | 200 Parts |
| Naphthenic acid metal soap*7 | 10 Parts |
| Octylic acid metal soap*8 | 10 Parts |
| Xylene | 130 Parts |
| Total | 1000 Parts |

Note*6 Beckosol ® EY 4006, manufactured by Dainippon Ink and Chemicals
Note*7 Naphthex ® Cobalt 8%, manufactured by The Nippon Chemical Industrial Co., Ltd.
Note*8 Nikkaoctix ® 20%, manufactured by The Nippon Chemical Industrial Co., Ltd.

In the same manner as Production Example 1, the total amount of titanium dioxide is dispersed in a mixture of a portion of alkyd resin and the total amount of xylene, followed by addition of the balance of the formula to give a paint component E.

PRODUCTION EXAMPLE 6

| | |
|---|---|
| Alkyd resin*11 | 140 Parts |
| Nitrocellulose*4 | 80 Parts |
| Titanium dioxide | 70 Parts |
| Calcium carbonate | 210 Parts |
| Talc | 120 Parts |
| Xylene | 160 Parts |
| Ethyl acetate | 130 Parts |
| MEK | 90 Parts |
| Total | 1000 Parts |

Note*11 Beckosol ® 1232-60-EL, manufactured by Dainippon Ink and Chemicals

The total amounts of titanium dioxide, talc and calcium carbonate are dispersed in a mixture of a portion of alkyd resin and the total amount of xylene until a grain size of not more than 20 μ is obtained, followed by addition of the balance of the formula to give a paint component F.

PRODUCTION EXAMPLE 7

| HDI biuret*9 | 1000 Parts |
|---|---|

Note*9 Sumidur ® N-75, manufactured by Sumitomo-Bayer Urethane Co., Ltd. (monovolatile matter 75%, NCO content 16.5%)

Production Example 8

| Ethyl acetate | | 200 Parts |
|---|---|---|
| MIBK | | 100 Parts |
| Xylene | | 650 Parts |
| Methoxypropyl acetate | | 50 Parts |
| | Total | 1000 Parts |

Production Example 9

| IPDI trimer*10 | | 87 Parts |
|---|---|---|
| Xylene | | 650 Parts |
| Ethyl acetate | | 180 Parts |
| MIBK | | 83 Parts |
| | Total | 1000 Parts |

Note*10 Sumidur ® Z-115, manufactured by Sumitomo Bayer Urethane Co., Ltd. [nonvolatile matter 70%, NCO content 11.5%]

The respective solvents are taken and, as a dehydrating agent, synthetic zeolite (Vilit TE-144) is added to the thinner at the level of 2%. The mixture is allowed to stand for 24 hours to establish a water content of not more than 300 ppm. To this mixture is added TPDI trimer to give a thinner-curing agent A of the invention. The NCO content of A is 1.0%. In the test, samples of this thinner were used after one-month storage in closed condition at room temperature or after one-month storage in open condition.

PRODUCTION EXAMPLES 10 THROUGH 12

| | Example 10 | Example 11 | Example 12 |
|---|---|---|---|
| IPDI trimer*10 | 174 Parts | 261 Parts | 391 Parts |
| Xylene | 563 Parts | 476 Parts | 346 Parts |
| Ethyl acetate | 180 Parts | 180 Parts | 180 Parts |
| MIBK | 83 Parts | 83 Parts | 83 Parts |
| Total | 1000 Parts | 1000 Parts | 1000 Parts |
| NCO content | 2% | 3% | 4.5% |
| Designation | B | C | D |

Except that the above formulas are used, the procedure of Production Example is followed to give thinner-curing agents A, C and D of the invention.

PRODUCTION EXAMPLE 13

| HDI biuret*9 | | 60 Parts |
|---|---|---|
| Xylene | | 650 Parts |
| Ethyl acetate | | 180 Parts |
| MIBK | | 110 Parts |
| | Total | 1000 Parts |

To the thinner dehydrated as in Production Example 9 is added HDI biuret and the mixture is used as a thinner-curing agent W. NCO content=1.0%.

PRODUCTION EXAMPLES 14 THROUGH 16

| | Example 14 | Example 15 | Example 16 |
|---|---|---|---|
| HDI biuret*9 | 120 Parts | 180 Parts | 270 Parts |
| Xylene | 590 Parts | 530 Parts | 440 Parts |
| Ethyl acetate | 180 Parts | 180 Parts | 180 Parts |
| MIBK | 110 Parts | 110 Parts | 110 Parts |
| Total | 1000 Parts | 1000 Parts | 1000 Parts |
| NCO content | 2% | 3% | 4.5% |
| Designation | X | Y | Z |

In the same manner as Production Example 13, control thinner-curing agent components X, Y and Z are prepared.

EXAMPLES 1 THROUGH 5 AND COMPARATIVE EXAMPLES 1 THROUGH 5

Coating compositions are prepared according to the formulas indicated in Tables 4 through 8. The application viscosity (Ford Cup No. 4) is adjusted to 13-25 seconds.

Polished and degreased cold-rolled steel sheets (JIS G 3141) were spray-coated with a lacquer primer-surfacer (Step Plasurf®, manufactured by Isamu Paint Co., Ltd.) and dried at 20° C. for 2 hours. The sheets were then wet-sanded, dried and, using an air spray gun, coated with the coating compositions of Examples 1 through 5 and Comparative Examples 1 through 5, respectively, in a dry film thickness of 40-50 μ, followed by forced drying at 60° C. for 30 minutes and further drying at 20° C. for 3 days to give testpieces.

Each coated plate was evaluated for gloss, appearance, pencil hardness, solvent resistance and weather resistance. The results are presented in Tables 4 through 8.

TABLE 4

| | Example 1 | | Comparative Example 1 | | |
|---|---|---|---|---|---|
| | A | B | A | B | C |
| Coating formula (parts) | | | | | |
| Paint component A (Production Example 1) | 100 | 100 | 100 | 100 | 100 |
| Thinner-curing agent C (Production Example 11) | | | | | |
| Closed-stored | 80 | — | — | — | — |
| Open-stored | — | 80 | — | — | — |
| Thinner-curing agent Y (Production Example 15) | | | | | |
| Closed-stored | — | — | 80 | — | — |
| Open-stored | — | — | — | 80 | — |
| Curing agent (Production Example 7) | — | — | — | — | 15 |
| Thinner (Production Example 8) | — | — | — | — | 65 |
| Film evaluation | | | | | |
| 60° Gloss | 96 | 94 | 95 | 84 | 95 |
| Appearance | o | o | o | x | o |
| Pencil hardness | H | H | H | 2B | 2H |
| Solvent resistance | o | o | o | x | o |
| Weather resistance | o | o | o | x | o |

TABLE 5

| | Example 2 | | Comparative Example 2 | | |
|---|---|---|---|---|---|
| | A | B | A | B | C |
| Coating formula (parts) | | | | | |
| Paint component D (Production Example 3) | 100 | 100 | 100 | 100 | 100 |
| Thinner-curing agent A | | | | | |

TABLE 5-continued

|  | Example 2 | | Comparative Example 2 | | |
|---|---|---|---|---|---|
|  | A | B | A | B | C |
| (Production Example 9) |  |  |  |  |  |
| Closed-stored | 80 | — | — | — | — |
| Open-stored | — | 80 | — | — | — |
| Thinner-curing agent W (Production Example 13) |  |  |  |  |  |
| Closed-stored | — | — | 80 | — | — |
| Open-stored | — | — | — | 80 | — |
| Curing agent (Production Example 7) | — | — | — | — | 5 |
| Thinner (Production Example 8) | — | — | — | — | 75 |
| Film evaluation |  |  |  |  |  |
| 60° Gloss | 90 | 91 | 91 | 74 | 91 |
| Appearance | o | o | o | x | o |
| Pencil hardness | H | H | H | B | H |
| Solvent resistance | o | o | o | x | o |
| Weather resistance | o | o | o | x | o |

TABLE 6

|  | Example 3 | | Comparative Example 3 | | |
|---|---|---|---|---|---|
|  | A | B | A | B | C |
| Coating formula (parts) |  |  |  |  |  |
| Paint component D (Production Example 4) | 100 | 100 | 100 | 100 | 100 |
| Thinner-curing agent B (Production Example 10) |  |  |  |  |  |
| Closed-stored | 60 | — | — | — | — |
| Open-stored | — | 60 | — | — | — |
| Thinner-curing agent X (Production Example 14) |  |  |  |  |  |
| Closed-stored | — | — | 60 | — | — |
| Open-stored | — | — | — | 60 | — |
| Curing agent (Production Example 7) | — | — | — | — | 8 |
| Thinner (Production Example 8) | — | — | — | — | 52 |
| Film evaluation |  |  |  |  |  |
| 60° Gloss | 93 | 92 | 93 | 72 | 93 |
| Appearance | o | o | o | x | o |
| Pencil hardness | H | H | H | B | H |
| Solvent resistance | o | o | o | x | o |
| Weather resistance | o | o | o | x | o |

TABLE 7

|  | Example 4 | | Comparative Example 4 | | |
|---|---|---|---|---|---|
|  | A | B | A | B | C |
| Coating formula (parts) |  |  |  |  |  |
| Paint component B (Production Example 2) | 100 | 100 | 100 | 100 | 100 |
| Thinner-curing agent D (Production Example 12) |  |  |  |  |  |
| Closed-stored | 80 | — | — | — | — |
| Open-stored | — | 80 | — | — | — |
| Thinner-curing agent Z (Production Example 16) |  |  |  |  |  |
| Closed-stored | — | — | 80 | — | — |
| Open-stored | — | — | — | 80 | — |
| Curing agent (Production Example 7) | — | — | — | — | 22 |
| Thinner (Production Example 8) | — | — | — | — | 58 |
| Film evaluation |  |  |  |  |  |
| 60° Gloss | 95 | 95 | 95 | 85 | 95 |
| Appearance | o | o | o | x | o |
| Pencil hardness | H | H | H | 2B | 2H |
| Solvent resistance | o | o | o | x | o |
| Weather resistance | o | o | o | x | o |

TABLE 8

|  | Example 5 | | Comparative Example 5 | | |
|---|---|---|---|---|---|
|  | A | B | A | B | C |
| Coating formula (parts) |  |  |  |  |  |
| Paint component E (Production Example 5) | 100 | 100 | 100 | 100 | 100 |
| Thinner-curing agent C (Production Example 11) |  |  |  |  |  |
| Closed-stored | 30 | — | — | — | — |
| Open-stored | — | 30 | — | — | — |
| Thinner-curing agent Y (Production Example 15) |  |  |  |  |  |
| Closed-stored | — | — | 30 | — | — |
| Open-stored | — | — | — | 30 | — |
| Thinner (Production Example 8) | — | — | — | — | 30 |
| Film evaluation |  |  |  |  |  |
| 60° Gloss | 87 | 88 | 89 | 72 | 84 |
| Appearance | o | o | o | x | o |
| Pencil hardness | H | H | H | HB | HB |
| Solvent resistance | o | o | o | x | x |
| Weather resistance | o | o | o | x | x |

Test Methods

Gloss: The 60° reflectance was measured with a mirror surface gloss meter.

Appearance: Each testpiece was visually inspected. The criteria used: ○ for no abnormality; × for an abnormality such as formulation of lumps.

Pencil hardness: This test was carried out using a scratch test pencil approved by the Japan Paint and Lacquer Testing Institute Solvent resistance: Each testpiece was immersed in toluene at 20° C. for 30 days. The criteria: o for no abnormality; × for dissolution of the coating film.

Weather resistance: Using the Sunshine Weather-o-Meter, each testpiece was subjected to 1000 hours of exposure and, then, evaluated for the appearance of the coating film.

The above tests were performed in accordance with JIS K 5400.

EXAMPLE 6 AND COMPARATIVE EXAMPLE 6

Coating compositions are prepared according to the formulas shown in Table 9 and the application viscosity (Ford Cup No. 4) of the compositions is adjusted to 18–30 seconds. Polished and degreased cold-rolled steel sheets (JIS G 3141) are spray-coated with the above coating compositions, respectively, and dried at 20° C. for 2 hours. The sheets are then wet-sanded, dried and spray-coated with a urethane metallic paint (Hi-Art ® #3000, manufactured by Isamu Paint Co., Ltd.). The thus-coated sheets are force-dried at 60° C. for 30 minutes and further dried at 20° C. for 3 days to give testpieces. Each testpiece is evaluated for adhesion, impact resistance, flexure resistance, humidity resistance and lifting resistance.

The results are shown in Table 9.

TABLE 9

|  | Example 6 | | Comparative Example 6 | | |
|---|---|---|---|---|---|
|  | A | B | A | B | C |
| Coating formula (parts) |  |  |  |  |  |
| Paint component A (Production Example 1) | 100 | 100 | 100 | 100 | 100 |
| Thinner-curing agent C (Production Example 11) |  |  |  |  |  |
| Closed-stored | 30 | — | — | — | — |

TABLE 9-continued

|  | Example 6 | | Comparative Example 6 | | |
| --- | --- | --- | --- | --- | --- |
|  | A | B | A | B | C |
| Open-stored Thinner-curing agent Y (Production Example 15) | — | 30 | — | — | — |
| Closed-stored | — | — | 30 | — | — |
| Open-stored | — | — | — | 30 | — |
| Thinner (Production Example 8) | — | — | — | — | 30 |
| Film evaluation | | | | | |
| Adhesion (Score) | 10 | 10 | 10 | 2 | 2 |
| Impact resistance | ○ | ○ | ○ | ○ | ○ |
| Flexure resistance | ○ | ○ | ○ | ○ | ○ |
| Humidity resistance | ○ | ○ | ○ | x | ○ |
| Lifting resistance | ○ | ○ | ○ | x | x |

TEST METHODS

Adhesion: The 1 mm square cross-hatch test was carried out by the cellophane tape method.

Impact resistance: The duPont impact tester was used. The weight and its height were 30 kg and 50 cm. The criteria ○ for no abnormality and × for cracking of the film.

Flexure resistance: The 180° flexure tester was used. The diameter of the mandrel was 3 mm. The criteria: ○ for no abnormality and × for peeling of the film.

Humidity resistance: Each testpiece was placed in the humidity resistance tester and 72 hours later, examined for change in appearance. The criteria: ○ for no abnormality and × for an abnormality such as blistering.

Lifting resistance: Toluene was dripped on the coating film and the surface condition after 1 minute was examined. The criteria: ○ for no abnormality; × for shrinking of the film.

The above tests were performed in accordance with JIS K 5400.

What is claimed is:

1. A two-package polyurethane coating composition kit comprising:
   (a) a first container containing a paint component comprising a hydroxyl-containing film-forming resin; and
   (b) a second container containing a thinner-curing agent component comprising a solution of isophorone diisocyanate trimer containing said trimer in a concentration of not more than 5 percent by weight as NCO in a sufficient amount of an active hydrogen-free organic solvent to insure an appropriate application viscosity, said containers being adapted for mixing the contents thereof at a coating site.

2. A coating composition kit according to claim 1 wherein said component in said second container has an NCO content of not more than 3 percent by weight.

3. A coating composition kit according to claim 1 wherein said hydroxyl-containing film-forming resin is a polyacrylate polyol.

4. A coating composition kit according to claim 1 wherein said hydroxyl-containing film-forming resin is an alkyd resin.

5. A coating composition kit according to claim 1 wherein said hydroxyl-containing film-forming resin has been modified by nitrocellulose and/or cellulose acetate butyrate.

* * * * *